United States Patent
Ormel et al.

(10) Patent No.: US 7,883,317 B2
(45) Date of Patent: Feb. 8, 2011

(54) METHOD FOR OPTIMIZING THE OPERATION OF A WIND TURBINE

(75) Inventors: Frank Theodoor Ormel, Hengelo (NL); Till Hoffmann, Osnabrück (DE); Henk-Jan Kooijman, Enschede (NL); André Riesberg, Wallenhorst (DE); Jean Louis Wesselink, Almelo (NL)

(73) Assignee: General Electric Company, Schenectady, NY (US)

( * ) Notice: Subject to any disclaimer, the term of this patent is extended or adjusted under 35 U.S.C. 154(b) by 1009 days.

(21) Appl. No.: 11/670,453

(22) Filed: Feb. 2, 2007

(65) Prior Publication Data

US 2007/0183885 A1 Aug. 9, 2007

(51) Int. Cl.
*B63H 3/10* (2006.01)
(52) U.S. Cl. .................. 416/1; 416/35; 416/61
(58) Field of Classification Search .................. 290/44, 290/55; 415/4.1, 15; 416/35, 61, 1, 37, 39, 416/41; 700/28, 29
See application file for complete search history.

(56) References Cited

FOREIGN PATENT DOCUMENTS

| DE | 19628073 C1 | 9/1997 |
|----|-------------|--------|
| DE | 19934415 B4 | 3/2005 |

*Primary Examiner*—Edward Look
*Assistant Examiner*—Sean J Younger
(74) *Attorney, Agent, or Firm*—GE Global Patent Operation; Peter T. DiMauro

(57) ABSTRACT

A method for optimizing the operation of a wind turbine is provided, the method comprising the steps of: (a) adjusting at least one control parameter of said wind turbine to a predetermined starting value; (b) measuring at least one response variable of said wind turbine and at least one further variable indicative of an ambient condition of the wind turbine; (c) repeating step (b) N times, wherein N is a predetermined integer, wherein said at least one control parameter is varied at each repetition; (d) determining a measured relation between the at least one control parameter with respect to the at least one response variable and the at least one further variable indicative of an ambient condition; (e) determining an optimized value of said at least one control parameter with respect to said response variable from said measured relation; (f) adjusting a set point of said at least one control parameter to said optimized value.

20 Claims, 6 Drawing Sheets

METHOD FOR OPTIMIZING THE OPERATION OF A WIND TURBINE

BACKGROUND OF THE INVENTION

The present invention relates to the field of control engineering, in particular to controlling the operation of a wind turbine. Furthermore, the invention relates to wind turbines having a control system.

The performance of a wind turbine depends on many factors which can be mainly divided into three different classes: ambient conditions, inherent turbine properties and controllable turbine properties. Furthermore, many of those factors are interdependent but the relation therebetween is uncertain or unknown. Since only the controllable turbine properties, e.g. blade pitch, rotor speed, yaw or the like, can be actively influenced by the turbine controller, theoretical turbine models have been developed to predict the turbine response and/or turbine performance for a variety of ambient conditions, inherent turbine properties and respective controller settings.

However, the basis for such theoretical models is uncertain. For example, errors or hidden damages may occur in the manufacturing process, during transport and installation or in the calibration of sensor and controller set points. Furthermore, the inherent properties of the turbine may change over time, e.g. by degradation of the blade surface, loosening of joints or the like. Furthermore, with the use of theoretical models there is a key need to have reliable information about the true ambient conditions like wind speed, wind direction, air density or the like. However, ambient condition data measured by sensors may have systematic errors due to the sensor position at the turbine (e.g. within the slipstream), sensor drift, faulty manufacture or other reasons. Finally, theoretical models are based on several assumptions and, also, have to make approximations to provide a practical implementation of the model. Thus, the theoretical model in itself as well as the input data for the model deviate from the real conditions at a specific turbine at a specific site. As a result, turbine control is not optimal.

BRIEF DESCRIPTION OF THE INVENTION

In view of the above, a method for optimizing the operation of a wind turbine is provided, the method comprising the steps of: (a) adjusting at least one control parameter of said wind turbine to a predetermined starting value; (b) measuring at least one response variable of said wind turbine and at least one further variable indicative of an ambient condition of the wind turbine; (c) repeating step (b) N times, wherein N is a predetermined integer, wherein said at least one control parameter is varied at each repetition; (d) determining a measured relation between the at least one control parameter with respect to the at least one response variable and the at least one further variable indicative of an ambient condition; (e) determining an optimized value of said at least one control parameter with respect to said response variable from said measured relation; and (f) adjusting a set point of said at least one control parameter to said optimized value.

The above described method establishes a relation based on measured values of the wind turbine response with respect to an actively adjusted controller setting for specific ambient conditions. Thus, the controller is optimized for a specific turbine having specific inherent properties and being installed at a specific site during specific ambient conditions. Accordingly, deviations in controller settings away from their optimum which are caused by variations or errors in calculations, manufacturing, installation, and operation can be corrected with the above method. Furthermore, the knowledge of the true ambient conditions is no longer required since the above method establishes a consistent relation between the measured signals and the controller setting.

Further aspects, advantages and features of the present invention are apparent from the dependent claims, the description and the accompanying drawings.

According to a further embodiment of the invention, a method for obtaining an optimized controller set point for a wind turbine is provided, the method comprising the steps of: (a) defining a subspace of performance variables of said wind turbine; (b) defining a subspace of ambient condition variables for said wind turbine; (c) defining a subspace of control variables of said wind turbine; (d) determining a sequence of control variable values in said subspace of control variables; (e) adjusting the control variables according to said sequence and, for each value of the control variables in said sequence, performing at least one short-term measurement of a value of said performance variables and said ambient condition variables, respectively; (f) calculate the residuals of said measured performance variable values with respect to a predetermined expected response behavior; (g) obtain an optimized value of said control variables from said residuals of the measured performance variable values.

According to another embodiment of the invention, a wind turbine is provided, the wind turbine comprising a first sensor for measuring a response variable of the wind turbine; a second sensor for measuring a variable indicative of an ambient condition of the wind turbine; and a controller for controlling a control parameter of the wind turbine, wherein the controller is adapted to actively adjust the control parameter, obtain measured values of said first and second sensors, and establish a measured relation between said control parameter and said response variable by a residual analysis of said sensor data, the controller being further adapted to obtain an optimized controller set point for said control parameter from said measured relation.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
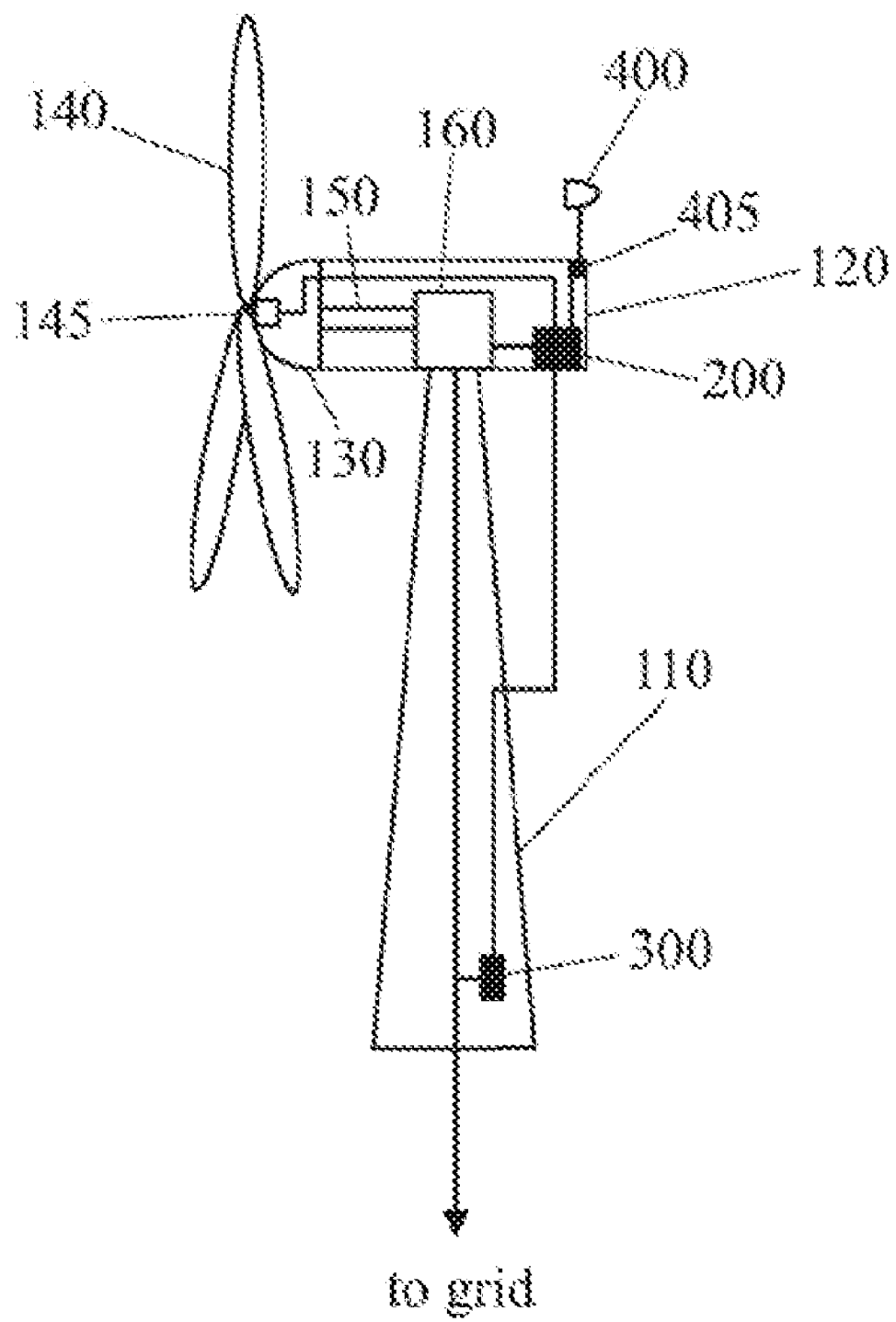
FIG. 1 shows a wind turbine according to an embodiment of the present invention.

FIG. 1 shows a wind turbine according to an embodiment of the present invention. Therein, the wind turbine 100 includes a tower 110 on top of which a nacelle 120 is mounted. A rotor hub 130 is mounted to a lateral end side of nacelle 120 and rotor blades 140 are fixed to hub 130. During operation of the wind turbine, rotor blades 130 capture wind energy and drive hub 130 to rotate about a substantially horizontal rotation axis. The rotation of hub 130 is transferred onto a shaft 150 to drive an electric generator 160. Thus, electric power is produced from the wind energy and can be supplied to a utility grid.

The wind turbine includes a controller 200 for controlling the operation of the turbine. Controller 200 is adapted to adjust a number of controllable turbine properties. For example, controller 200 is connected to a pitch drive 145 so that the pitch angle of the rotor blades 140 can be adjusted by controller 200. Furthermore, controller 200 is connected to generator 160 so that the electric parameters of generator 160 are controlled by controller 200. It will be understood by those skilled in the art that these are only examples of the many control variables which can be controlled by controller 200. Typical other control variables controlled by controller 200 include yaw angle and rotor speed.

Furthermore, the wind turbine includes a sensor 300 for measuring the power output of generator 160, e.g. by measuring voltage and/or current. Also, the wind turbine 100 includes an anemometer 400 which is adapted to measure wind speed and, optionally, wind direction as ambient condition variables. Anemometer 400 includes a data interface 405 adapted to convert the measurements of anemometer 400 into a suitable data format. The data captured by sensors 300, 400 are provided to controller 200 which utilizes the measured data for the turbine control. It will be understood by those skilled in the art that these are only examples for the many ambient condition variables and turbine response variables which can be measured by these and/or additional sensors. In particular, the ambient condition variables may include turbine site, wind speed, wind direction, date, time of day, time of year, air density, temperature, air turbulence, air pressure, and rain conditions. Furthermore, the response variables may include power output, mechanical loads, aerodynamic loads, turbine vibrations, and noise emission.

Controller 200 is adapted to carry out an optimization method according to an embodiment of the present invention. The various embodiments of methods that could be implemented in controller 200 will now described below with reference to FIGS. 2 to 6.

Figure 2:
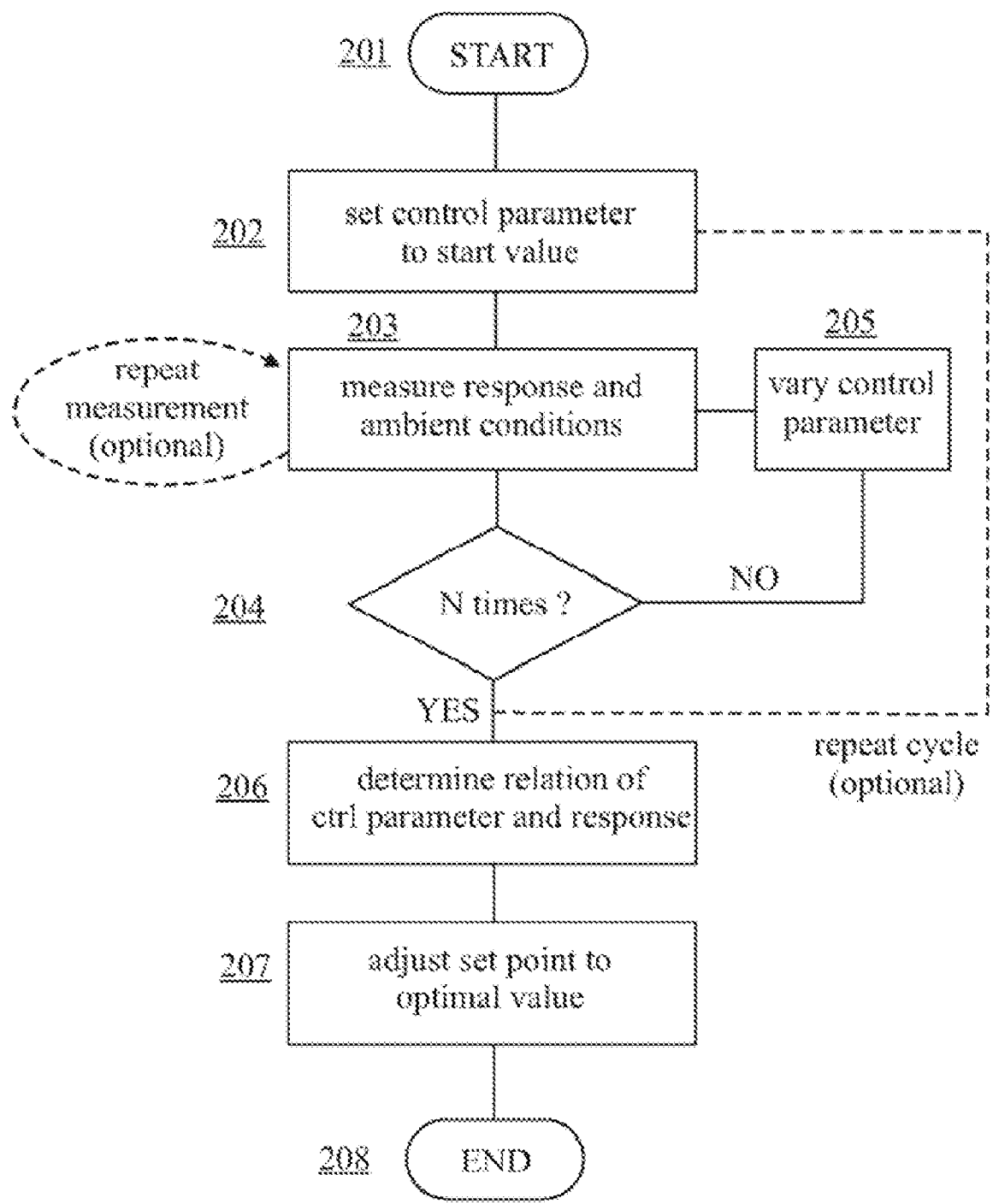
FIG. 2 shows a flow diagram of a method according to an embodiment of the present invention.

FIG. 2 shows a flow diagram of a method according to a first embodiment of the present invention. Therein, after the start of the optimization method in step 201, at least one control parameter of a wind turbine is adjusted to a predetermined start value in step 202.

Next, at least one response variable of the wind turbine and at least one further variable indicative of an ambient condition are measured in step 203. In this context, it should be understood that the control parameters may include at least one of blade pitch, yaw angle, rotor speed, and an electric generator control parameter, the response variables may include at least one of power output, mechanical loads, aerodynamic loads, turbine vibrations, noise emission, and the ambient condition variables may include at least one of turbine site, wind speed, wind direction, date, time of day, time of year, air density, temperature, air turbulence, air pressure, rain. Typically, the measurement is carried out as a short-term measurement so that the ambient conditions of the wind turbine are substantially constant during measurement. In particular, typical measurement duration vary between 1 to 10 seconds, more typically between 1 and 5 seconds or even only 1 second. Due to the short-term measurement, the influence of variations in the ambient conditions on the response variable can be largely excluded. Accordingly, a consistent relation between the actively adjusted controller parameters and the measured response variables can be determined. Of course, measuring the ambient conditions is still required to confirm that the changes thereof during the measurement period can be neglected. As it is shown in FIG. 2, as an optional feature the measurement can be repeated for the same control parameter setting one or more times. Thus, a sufficient data base for statistical analysis of the measurement data is formed. For example, a specific controller setting could be maintained for a measurement period of about 5 minutes while performing short-time measurements of 2 seconds duration. Thus, 150 data points are collected within the 5 minute measurement period.

In the next step 204, it is checked how often the above described measurements have been carried out. Typically, N different values of the control parameter are predetermined for which the measurements are to be carried out, wherein N is a positive integer. If there have been less than the scheduled N measurements, the at least one control parameter is shifted to its next value in step 205 and the measurement is carried out in step 203 with the new controller setting, i.e. for the new value of the control parameter. For example, the measurements may be carried out for 12 different values of the control parameter so that, in the above example, 1800 data points are collected within 1 hour, each data point representing a 2-second measurement for a given controller setting. As a further optional feature, the whole measurement cycle may be repeated one or more times, i.e. steps 202 to 205 may be carried out again after completion of a measurement cycle has been determined in step 204. For example, 5 complete cycles may be scheduled in the above example so that 9000 data points are collected within a 5-hour measurement. Thus, a sufficient data base for the following analysis can be obtained.

Next, a measured relation between the at least one control parameter and the at least one response variable is determined in step 206. Typically, the step 206 includes the calculation of the residuals of the response variable with respect to a predetermined response curve or function. When the present method is first applied in a specific turbine, the predetermined response function is a theoretically and/or empirically predetermined response function which has been implemented in the turbine controller. However, later on the measured relations obtained by the present method can be used as predetermined response curves. Thus, the obtained relations can be verified or changes in the turbine behavior can be detected. Typically, the control parameter values, the residuals and the ambient condition data are binned to obtain the measured relation between the various variables. Since the relations between the control parameters and the response variables are determined from measured values, it is not longer necessary that the recorded data represent the true conditions just as long as they hold a consistent relation as such. Therefore, an optimal value for the controller parameter obtained from the measured relation is a "true" optimal value although it may not be optimal in the theoretical turbine model. Furthermore, the "true" optimal value determined by the described embodiments may vary over time when ambient conditions change, e.g. from summer to winter, or inherent turbine properties change, e.g. degradation of the rotor blade surfaces. Accordingly, an optimal controller setting determined by a method according to one of the embodiments will always be optimized with respect to the specific conditions of the specific turbine on which the optimization method is carried out.

Finally, in step 207 the set point of the at least one control parameter is set to the optimal value previously determined. Thus, the operation of the wind turbine is optimized since the controller can control the turbine according to its specific inherent properties and ambient conditions.

Summarizing the above, the embodiments according to the present invention utilize systematic variations in a response variable by controlled changes of certain control parameters. The results of these controlled changes are measured during short periods of time to exclude the influence of external factors. Analyzing the measured data captured during the short-time measurements reveals a measured relation between the control parameters and the response variables. An optimal value for the set point of the control parameter can be obtained from the measured relation, the set point being optimal for that specific turbine having specific turbine properties and specific ambient conditions. If any of these conditions change so that they lie outside certain limits, the optimization procedure can be repeated. Also, the optimization process can be scheduled at regular intervals to verify that the controller setting is still optimal.

Furthermore, it will be understood by those skilled in the art that the above described method can be employed to establish a relation between a single control parameter and a single response variable but also for two or more control parameters and s single response variable. Thus, the mutual influences between control parameters can be determined and understood. Also, it is possible to optimize the turbine control not only with respect to one response variable (e.g. power output) but, concurrently, with respect to a further response variable (e.g. mechanical load). Also, changes in the ambient conditions (e.g. temperature, pressure, rain, etc.) can be taken into account in the analysis.

Figure 3:
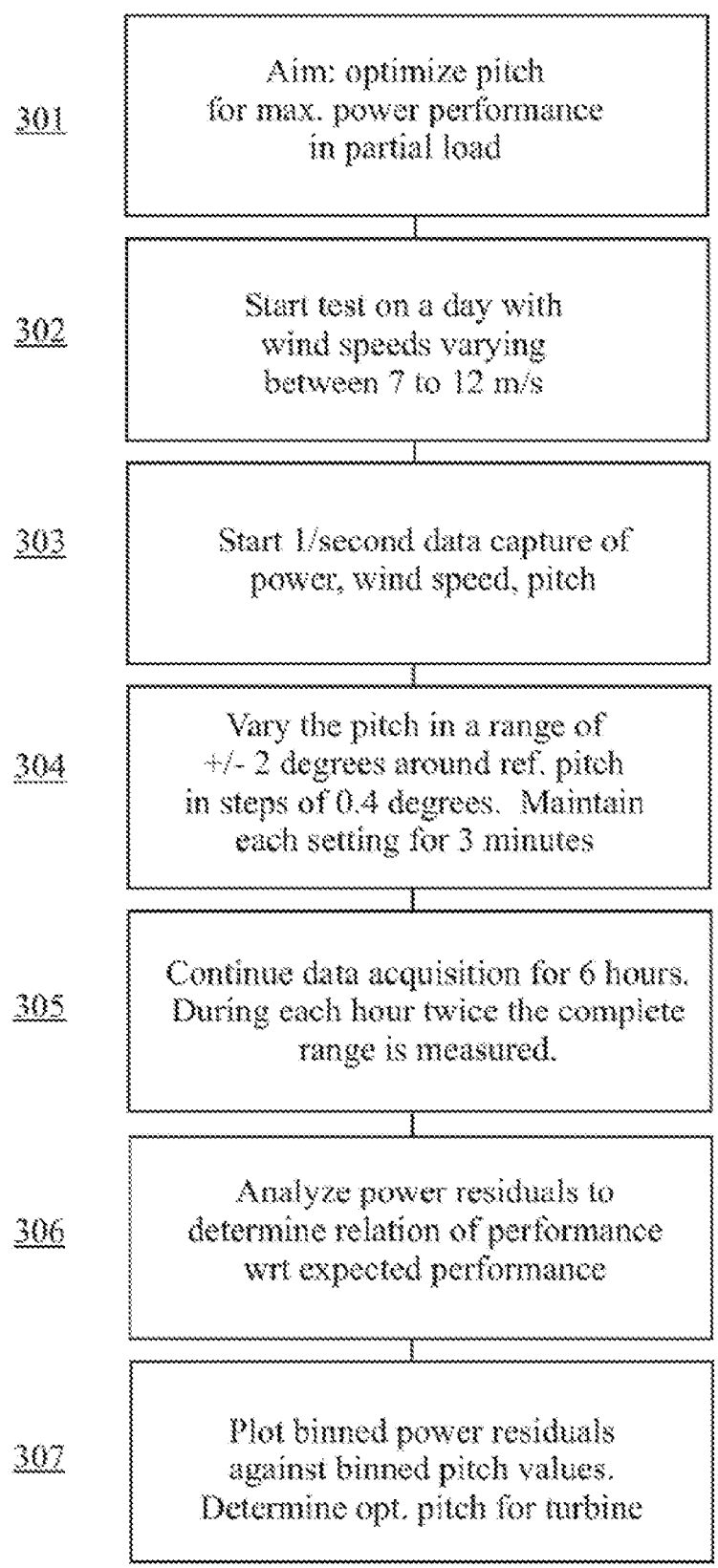
FIG. 3 shows a flow diagram of a method according to further embodiment of the present invention.
Figure 4:
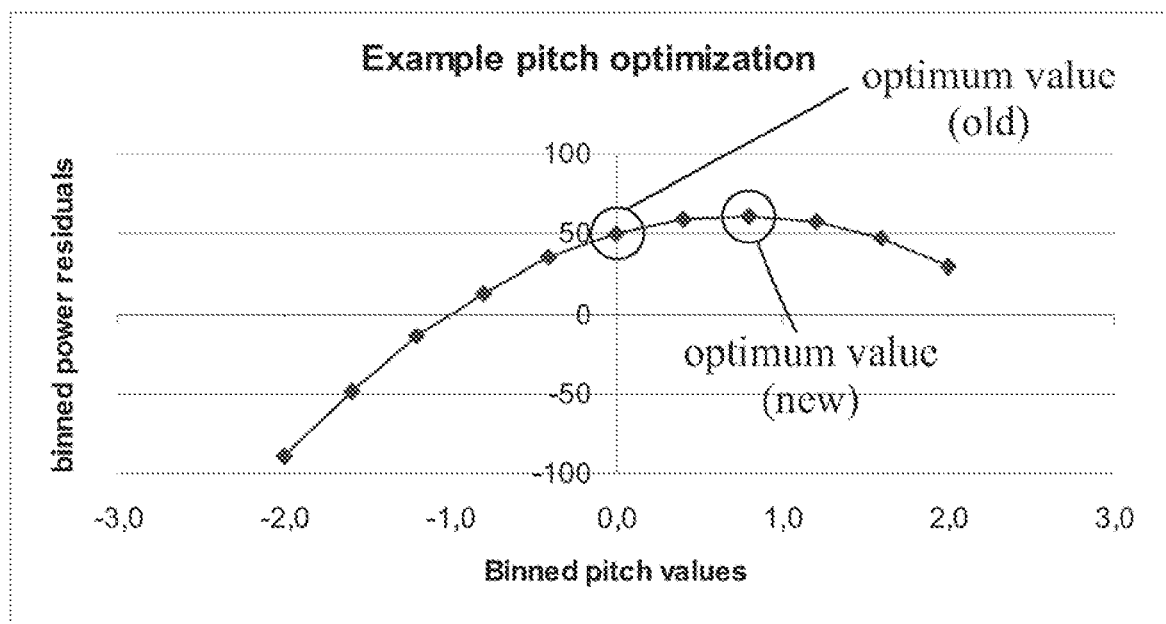
FIG. 4 shows a diagram of a measured relation between pitch and output power according to an embodiment of the present invention.

FIG. 3 shows a flow diagram of a method according to further embodiment of the present invention. Therein, the above described method is applied to a particular example. The aim of the optimization is to optimize the blade pitch controller setting for maximum power output in partial load conditions, i.e. during low wind speeds (step 301). In a first step 302, the optimization procedure is started on a day with wind speeds varying between 7 and 12 m/s, i.e. on a day having sufficient ambient conditions. Next, pitch, power and wind speed are selected as relevant data and a duration of the measurement period is set to 1 second (step 303). In the following step 304, the blade pitch for all three blades is set to the reference pitch minus 2 degrees and power and wind speed data are collected. This setting is maintained for 3 minutes so that 3×60=180 data points of 1-second measurements are collected. Then, the controller increases the pitch by 0.4 degrees and repeats the 3-minute measurement cycle to obtain another 180 data points for the new pitch value. This is repeated again with an increment of 0.4 degrees for the pitch until the upper endpoint of reference pitch plus 2 degrees is reached. Thus, a total of 3×60×11=1980 data points of 1-second measurements are collected within 33 minutes. After completion, the measurement cycle is repeated for the next six hours or so. Since the measurement cycle can be completed twice in almost an hour, a total of 3×60×11×12=23760 data points of 1-second measurements are collected within an afternoon. Next, the data is analyzed by calculating the residuals of the measured power values with respect to the expected power values (step 306). Since the analysis is based on a large number of short-time measurements, the results are largely independent of the actual wind speed. Finally, a measured relation between blade pitch and power output at partial load is obtained (step 307) to find an optimal pitch value for the controller set point. The relation is established by plotting the binned power residuals against the binned pitch values. The result is shown in FIG. 4. Therein, it can be seen that the old optimal value, i.e. the actual controller set point for the reference pitch at 0° degrees, was suboptimal. Instead, a new optimal value is determined at +0.8° degrees. Accordingly, the controller set point is increased by +0.8° degrees to obtain better turbine performance at partial load conditions. It will be understood by those skilled in the art that the above method relies only on the measured relation between pitch and output power. Therefore, even if the actual pitch angle of the rotor blades deviates from its desired value, e.g. due to a faulty senor, the optimal controller set point value is determined. Thus, the present method overcomes the shortcomings of control strategies based on theoretical turbine models.

Figure 5:
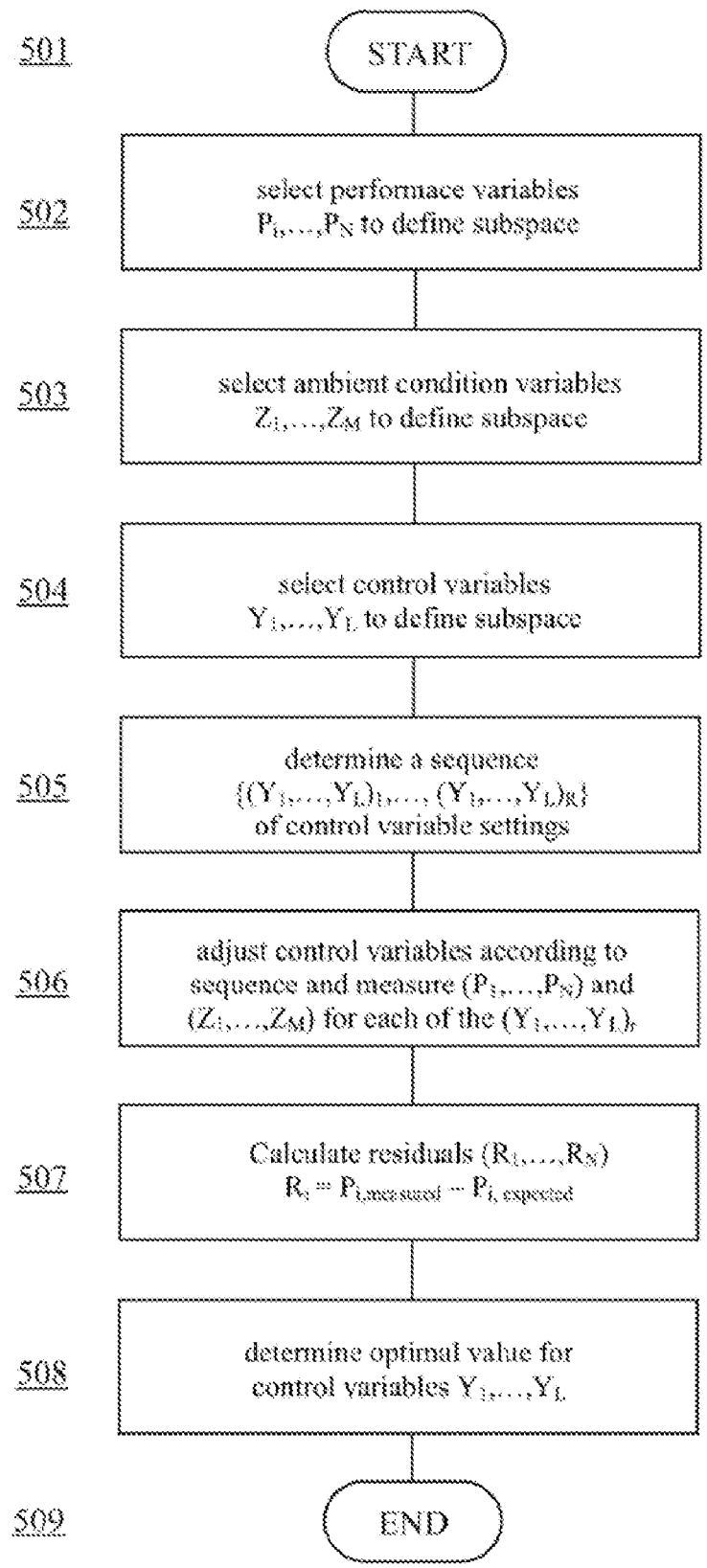
FIG. 5 shows a flow diagram of a method according to still another embodiment of the present invention.

FIG. 5 shows a flow diagram of a method according to still another embodiment of the present invention. The method according to the present embodiment is based on the following. A wind turbine may be understood as a complex system responding in a specific way to a specific input. The response of the wind turbine can be described by various performance variables $P_i$, $1 \leq i \leq N$. which may include power output, mechanical loads, aerodynamic loads, turbine vibrations, or noise emission. The turbine performance is governed by the ambient conditions of the turbine $Z_j$, $1 \leq j \leq M$, which may include turbine site, wind speed, wind direction, date, time of day, time of year, air density, temperature, air turbulence, air pressure, and rain conditions, by the control parameters $Y_k$, $1 \leq k \leq L$, which may include blade pitch, yaw angle, rotor speed, or an electric generator control parameter, and the inherent properties $X_s$, $1 \leq s \leq Q$, which may include of the diameter of the rotor blades, the number of poles of the electric generator or the like. The relation between turbine performance/response and the input variables is expressed by the following equation for the $P_i$ $$P = f(X, Y, Z)$$

or $$P_i = f_i(X_1, \ldots, X_Q, Y_1, \ldots, Y_L, Z_1, \ldots, Z_M).$$

It will be understood by those skilled in the art, that only the control parameters $Y_k$ can be actively controlled while the $X_s$ and $Z_j$ may vary independent of the turbine control. Therefore, the control parameters $Y_k$ have to be determined as functions of the $X_s$ and $Z_j$ $$Y = f(X, Z)$$

or $$Y_k = f_k(X_1, \ldots, X_Q, Z_1, \ldots, Z_M).$$

Typically, some performance variables are more interesting than others and, also, it can be theoretically or empirically shown that some control parameters influence these performance variables more than other control parameters.

Figure 6:
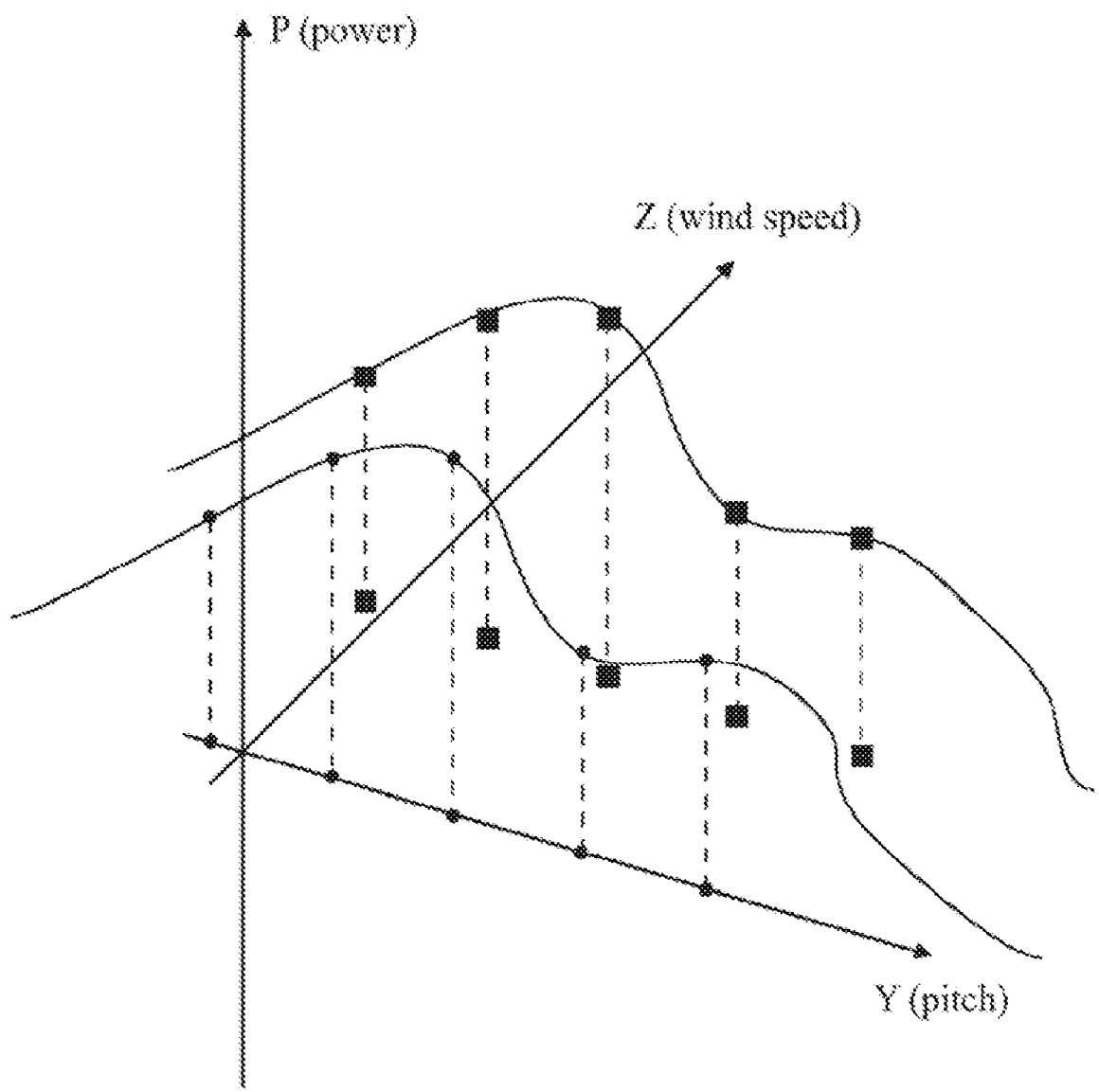
FIG. 6 shows a diagram explaining the definition of subspaces according to the method shown in FIG. 5.

In view of the above, the method according to the present embodiment first defines a subspace of interesting performance variables to be optimized. This is done by selecting a subgroup of performance variables $P_{i1}, \ldots, P_{iN}$ to be simultaneously optimized (step 502). Next, a subspace of ambient condition variables is defined by selecting a subgroup of ambient condition variables $Z_{j1}, \ldots, Z_{jM}$ in step 503. Finally, a subgroup of control variables $Y_{k1}, \ldots, Y_{kL}$ is selected to define a subspace of control variables on which the performance variables $P_{i1}, \ldots, P_{iN}$ are to be optimized (step 504). A simple example of defining such subspaces is shown in FIG. 6. Therein, the performance variable P to be optimized is power output, the ambient condition variable Z selected for optimization is wind speed, and the control parameter Y to be optimized is blade pitch. Accordingly, the example shown in FIG. 6 is similar to the embodiment described in FIG. 3.

Next, a sequence of control variable values $\{(Y_{k1}, \ldots, Y_{kL})_1, \ldots, (Y_{k1}, \ldots, Y_{kL})_R\}$ is determined in step 505 so that the sequence will substantially cover the interesting portion of the subspace defined by the control variables $Y_k$. For example, R is set to 5 in FIG. 6 so that a sequence of 5 values for blade pitch is determined. Two of those sequences are shown in FIG. 6 wherein a first sequence (dots) is related to a partial load regime (lower wind speeds) whereas a second sequence (squares) is related to a full load regime (high wind speeds). In a next step 506, the turbine controller actively adjusts the control variables $Y_{k1}, \ldots, Y_{kL}$ according to the predetermined sequence and measures the values of the performance variables $P_{i1}, \ldots, P_{iN}$ and the values of the ambient condition variables $Z_{j1}, \ldots, Z_{jM}$. Typically, the measurement is carried out as a short-term measurement of 1 to 10 seconds length, more typically 1 to 3 seconds length, so that the ambient condition variables $Z_{j1}, \ldots, Z_{jM}$ are substantially constant during the measurement period. Thus, measurement data are collected for any of the controller settings according to the predetermined sequence. As an optional feature, the measurement may be repeated as often as desired to increase the number of data points collected. In particular, many short-term measurements may be repeated for the same value of the control variables $(Y_{k1}, \ldots, Y_{kL})_r$ within the sequence. For example, a specific controller setting $(Y_{k1}, \ldots, Y_{kL})_r$ may be maintained for 12 minutes while repeating 3-second measurements of the performance variables $P_{i1}, \ldots, P_{iN}$ and the ambient condition variables $Z_{j1}, \ldots, Z_{jM}$. Thus, 240 data points are collected for the specific controller setting $(Y_{k1}, \ldots, Y_{kL})_r$ within the 12-minute measurement period. In the example of FIG. 6, the full sequence of five controller settings can be measured within one hour, thus collecting 1200 data points on which later statistical analysis can be based. As another optional feature, the measurement of the full sequence may be repeated as often as desired and/or allowed by ambient conditions. For example, the 1-hour sequence measurement may be repeated six times so that 7200 data points are collected within a six hour measurement period. If, for example, the wind speeds will increase to the full load regime after three hours of measurement, the sequence may be interrupted at that point and continued on another day when the wind speeds are again within the partial load regime.

In the next step 506, the residuals of the measured performance variables with respect to the expected performance variables are calculated for each of the controller settings $$(R_{i1}, \ldots, R_{iN})_r = (P_{i1}, \ldots, P_{iN})_r^{measured} - (P_{i1}, \ldots, P_{iN})_r^{expected}.$$

In the case that many measurements have been performed for the same controller setting $(Y_{k1}, \ldots, Y_{kL})_r$, the residuals $(R_{i1}, \ldots, R_{iN})_r$ are binned to obtain a measured relation between the controller settings and the turbine performance. Finally, an optimum value for the controller setting $(Y_{k1}, \ldots, Y_{kL})_r$ is determined in step 508 from the measured relation. The optimal value can be used to adjust the controller set points so that the turbine operation is optimized.

Although the above embodiment has been explained with respect to only one control parameter (pitch), only one ambient condition variable (wind speed), and only one performance variable (power output), it will be understood by those skilled in the art that the principles of the described optimization method may also be applied to the simultaneous optimization of two or more control parameters, with respect to two or more performance variables, and/or taking into account two or more ambient condition variables. In any of those implementations, active changes in the control parameters of the turbine are introduced to measure the response of the turbine and, thus, detect the actual interdependencies of the variables influencing turbine performance. Thus, consistent relations between controller settings and turbine performance are established regardless of whether the captured sensor data represent "true" conditions or not.

According to an even further embodiment of the present invention, the above-described concept of determining measured relations can even be utilized to detect and correct sensor drift or abrupt changes in the sensor signals, e.g. due to failure, wear and tear or due to maintenance personnel accidentally pressing against a wind vane. In particular, sensor drift is difficult to detect since it may be mistaken for a gradual change in ambient conditions. However, if an optimization method according to an embodiment of the present invention is regularly carried out on a specific turbine, a sensor drift also leads to a drift in controller set points. Therefore, if a correlation between the two is detected, this is a strong indicator of a sensor drift. Accordingly, the sensor drift may be corrected by applying an appropriate bias or offset to the defective sensor signal. Likewise, an abrupt change in the sensor signal may be corrected by applying such bias or offset.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A method for optimizing the operation of a wind turbine, comprising the steps of:
    (a) adjusting at least one control parameter of said wind turbine to a predetermined starting value;
    (b) measuring at least one response variable of said wind turbine and at least one further variable indicative of an ambient condition of the wind turbine;
    (c) repeating step (b) N times, wherein N is a predetermined integer, wherein said at least one control parameter is varied at each repetition;
    (d) determining a measured relation between the at least one control parameter with respect to the at least one response variable and the at least one further variable indicative of an ambient condition;
    (e) determining an optimized value of said at least one control parameter with respect to said response variable from said measured relation;
    (f) adjusting a set point of said at least one control parameter to said optimized value.

2. The method according to claim 1, wherein a short-term measurement is carried out so that the ambient conditions are substantially constant during measurement.

3. The method according to claim 1, wherein the measurement is carried out for 1 to 10 seconds.

4. The method according to claim 1, wherein step (b) is repeated at least once with the same value of said at least one control parameter.

5. The method according to claim 1, wherein steps (a) to (c) are repeated at least once.

6. The method according to claim 1, wherein two or more control parameters are actively adjusted to determine optimized values for the two or more control parameters.

7. The method according to claim 1, wherein two or more response variables are measured to determine the optimized value of said at least control parameter with respect to the two or more response variables.

8. The method according to claim 1, wherein two or more control parameters are actively adjusted and wherein two or more response variables are measured to determine the optimized values of the two or more control parameters with respect to the two or more response variables.

9. The method according to claim 1, wherein step (d) of determining a measured relation comprises:
   (d1) obtaining residuals of the response variable with respect to a predetermined response curve;
   (d2) binning the residuals and binning the control parameter values to obtain the measured relation.

10. The method according to claim 1, wherein the at least one control parameter is selected from the group consisting of: blade pitch, yaw angle, rotor speed, and an electric generator control parameter.

11. The method according to claim 1, wherein the at least one response variable is selected from the group consisting of: power output, mechanical loads, aerodynamic loads, turbine vibrations, noise emission.

12. The method according to claim 1, wherein the at least one variable indicative of an ambient condition is selected from the group consisting of: turbine site, wind speed, wind direction, date, time of day, time of year, air density, temperature, air turbulence, air pressure, rain.

13. The method according to claim 1, wherein a sensor drift in a defective sensor is detected by detecting a drift of at least one controller set point obtained in step (e).

14. The method according to claim 13, wherein, in step (e), the sensor drift is corrected by biasing a controller set point related to the defective sensor.

15. A method for obtaining an optimized controller set point for a wind turbine, comprising the steps of:
   (a) defining a subspace of performance variables of said wind turbine;
   (b) defining a subspace of ambient condition variables for said wind turbine;
   (c) defining a subspace of control variables of said wind turbine;
   (d) determining a sequence of control variable values in said subspace of control variables;
   (e) adjusting the control variables according to said sequence and, for each value of the control variables in said sequence, performing at least one short-term measurement of a value of said performance variables and said ambient condition variables, respectively;
   (f) calculate the residuals of said measured performance variable values with respect to a predetermined expected performance behavior;
   (g) obtain an optimized value of said control variables from said residuals of the measured performance variable values.

16. The method according to claim 15, wherein, in steps (b) and (c), the subspaces are defined to exclude variables of minor influence on the performance variables spanning said subspace defined in step (a).

17. The method according to claim 15, wherein control variables are selected from the group consisting of: blade pitch, yaw angle, rotor speed, and an electric generator control parameter, the performance variables are selected from the group consisting of: power output, mechanical loads, aerodynamic loads, turbine vibrations, noise emission, and/or the ambient condition variables are selected from the group consisting of: turbine site, wind speed, wind direction, date, time of day, time of year, air density, temperature, air turbulence, air pressure, rain.

18. A wind turbine, comprising:
   a first sensor for measuring a response variable of the wind turbine;
   a second sensor for measuring a variable indicative of an ambient condition of the wind turbine;
   a controller for controlling a control parameter of the wind turbine, wherein the controller is adapted to actively adjust the control parameter, obtain measured values of said first and second sensors, and establish a measured relation between said control parameter and said response variable by a residual analysis of said sensor data, the controller being further adapted to obtain an optimized controller set point for said control parameter from said measured relation.

19. The wind turbine according to claim 18, wherein the first sensor, the second sensor, and the controller are adapted to perform and analyze short-term measurements so that the ambient conditions are substantially constant during measurement.

20. The wind turbine according to claim 18, comprising two or more sensors for measuring two or more response variables of the wind turbine and wherein the controller is adapted to actively adjust two or more control parameters and wherein two or more response variables are measured to determine the optimized values of the two or more control parameters with respect to the two or more response variables.

* * * * *